June 24, 1924.
F. M. HOLLINGSWORTH
WIRE STRETCHER
Filed Sept. 23, 1920
1,498,730
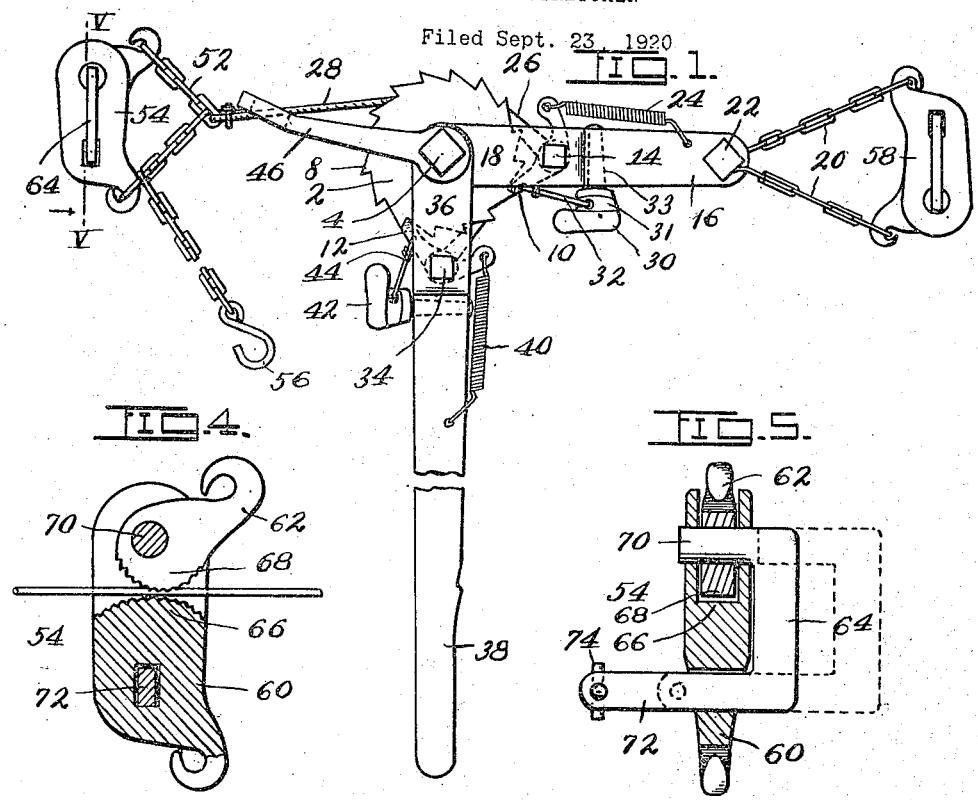
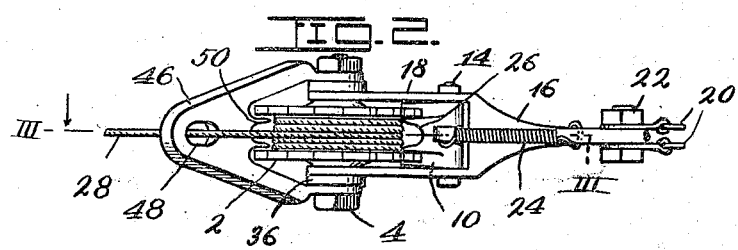
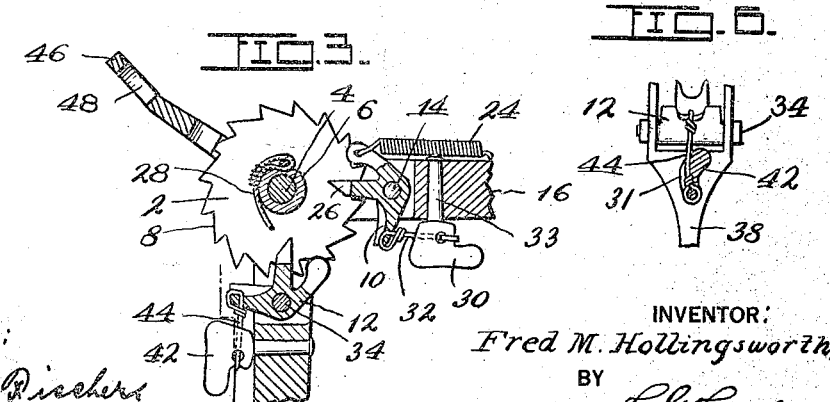
Witness:
Fred C. Fischer
INVENTOR:
Fred M. Hollingsworth,
BY
F. G. Fischer,
ATTORNEY Patented June 24, 1924.

1,498,730

UNITED STATES PATENT OFFICE.

FRED M. HOLLINGSWORTH, KANSAS CITY, KANSAS.

WIRE STRETCHER.

Application filed September 23, 1920. Serial No. 412,209.

*To all whom it may concern:*

Be it known that I, FRED M. HOLLINGSWORTH, a citizen of the United States, residing at Kansas City, in the county of Wyandotte and State of Kansas, have invented certain new and useful Improvements in Wire Stretchers, of which the following is a specification.

This invention relates to wire stretchers and one object is to provide a new and useful device of this character which may be employed to advantage in the construction and repair of wire fences.

A further object is to provide a wire stretcher of few parts not likely to get out of order and which can be readily assembled, and in order that the invention may be fully understood, reference will now be had to the accompanying drawing, in which:

Fig. 1 is a side elevation of the device.

Fig. 2 is a plan view of the device with some of the parts omitted.

Fig. 3 is an irregular vertical section on line III—III of Fig. 2.

Fig. 4 is an enlarged horizontal section of a clamp employed in carrying out the invention.

Fig. 5 is a cross section of the clamp taken on line V—V of Fig. 1.

Fig. 6 is a fragmentary section one line VI of Fig. 3.

In carrying out the invention, I employ a spool 2 which is journaled upon a bolt or other suitable shaft 4. The spool 2 has a central drum portion 6 and its marginal flanges have peripheral ratchet teeth 8, which coact with pawls 10 and 12 in preventing backward rotation of the spool when taking up wire.

The pawl 10 is mounted upon a suitable bolt or pivot 14 which is carried by a draft arm 16 having a bifurcated end 18 to straddle the spool 2, as disclosed more clearly on Fig. 2. The bifurcated end 18 of the draft arm 16 is freely mounted upon the shaft 4, while the opposite ends of said draft arm 16 has a pair of chains 20 connected thereto by suitable means such as a bolt 22.

The pawl 10 is normally held in engagement with the ratchet teeth 8 of the spool 2 by means of a coil spring 24 connected at its ends to said pawl 10 and the draft arm 16. A bifurcated guide 26 is formed integral with the pawl 10 to coact with other guides hereinafter described in preventing a cable 28 attached at one end to the drum portion 6 from moving laterally out of position and passing over the ratchet teeth 8 where it would likely get caught between the bifurcated end 18 of the draft arm 16 and the marginal flanges of the spool 2.

A rotary element 30 swiveled to the draft arm 16 and connected to the pawl 10 by a wire or other element 32, is provided for throwing and holding the pawl 10 out of engagement with the ratchet teeth 8, as disclosed by Fig. 3. Said rotary element 30 has a groove 31 in one side to receive the wire 32, so that the same will pull on a line with the center of the element shank 33 and prevent the element 30 from accidentally resuming normal position after being turned about a half revolution to throw the pawl 10 out of engagement with the ratchet teeth 8.

The pawl 12 is a duplicate of the pawl 10 and is mounted upon a bolt or pivot 34 extending through the bifurcated end 36 of a hand lever 38 freely mounted upon the shaft 4. The pawl 12 is normally held in engagement with the ratchet teeth 8 of the spool 2 by means of a coil spring 40, attached at one end to said pawl 12 and at its opposite end to the hand lever 38. A rotary element 42, which is a duplicate of the rotary element 30, is swiveled in the hand lever 38 and connected to the pawl 12 by a wire or other element 44 for the purpose of throwing and holding the pawl 12 out of engagement with the ratchet teeth 8, when said element is rotated about a half revolution, as disclosed by Fig. 6.

46 designates a bifurcated guide which coacts with the guides on the pawls 10 and 12 in holding the cable 28 in proper position upon the spool 2. Said guide 46 is freely mounted on the shaft 4 and provided at one end with an eye 48 through which the cable 28 freely operates. The other end of the guide 46 is bifurcated and has a guide 50, which extends between the flanges of the spool 2 to coact with the eye 48 and the guides on the pawls 10 and 12 in holding the cable 28 in proper position upon said spool 2.

The free end of the cable 28 is connected to a chain 52 which in turn is connected to the ends of a clamp 54. The free end of the chain 52 is provided with a hook 56 for a purpose which will hereinafter appear.

The clamp 54 is a duplicate of a clamp 58 connected to the outer ends of the chains 20 and consisting of members 60 and 62 and a U-shaped connecting member 64. The members 60 and 62 have adjacent jaws 66 and 68, respectively, the latter being eccentric to a pivot 70 forming part of the connecting member 64 and upon which the member 62 is freely mounted. The pivot 70 is formed integral with one end of the connecting member 64, which is provided at its opposite end with a shank 72 through which a cotter or other pin 74 extends to prevent said connecting member from becoming accidentally disengaged from the clamp member 60. As disclosed on Fig. 5, the pivot member 70 is shorter than the member 72, so that said member may be withdrawn from the clamp members 60 and 62 as indicated by dotted lines to disconnect said clap members without disconnecting the shank 72 from the clamp member 60. Thus the connecting member 64 cannot become lost from the clamp member 60. By making the member 62 removable the clamp can be readily applied to a barbed or other fence wire.

In practice when two fence wires are to be connected their ends are arranged to overlap so that they may be twisted together while being held by the clamps 54 and 58. The two wires are drawn taut by intermittently swinging the hand lever 38 to the left (Fig. 1), which operation rotates the spool 2 through the intermediacy of the pawl 12 and thus winds the cable 28 upon said spool. Each time the hand lever 30 is swung to the right preparatory to engaging the pawl 12 in the teeth 8, the pawl 10 engages said teeth 8 and prevents the spool 2 from rotating backwardly and allowing the cable 28 to unwind. While the cable 28 is being wound upon the spool 2 the two fence wires are firmly held between the jaws of the respective clamps 54 and 58. After the two fence wires have been drawn as taut as desired and fastened together, the elements 30 and 42 are rotated to disengage the pawls 10 and 12 from the ratchet teeth 8, so that the spool 2 may rotate backwardly and allow the wire 28 to become slack. The members of the clamps 54 and 58 are disconnected, so that clamps can be readily removed from the connected fence wires.

From the foregoing description it will be understood that I have provided a wire stretcher embodying the advantages above pointed out, and while I have shown and described the preferred construction of the invention, I reserve the right to make such changes as properly fall within the spirit and scope of the claims.

Having thus described my invention, what I claim and desire to secure by Letters Patent, is:

1. A device of the character described consisting of a draft arm, a shaft carried by said draft arm, a spool journaled on said shaft and provided with ratchet teeth, a cable attached to said spool and adapted to be wound thereon, a pawl operably mounted on the draft arm to engage the ratchet teeth and prevent the spool from rotating backwardly, a guide on said pawl to retain the cable in proper position upon the spool, a hand lever operably mounted on the shaft, and means associated with said hand lever to coact therewith in rotating the spool forwardly.

2. In a device of the character described, a draft arm, a spool associated with said draft arm and provided with ratchet teeth, a cable attached to said spool and adapted to be wound thereon, a hand lever associated with the spool, a pawl associated with said hand lever to engage the ratchet teeth and coact with the hand lever in rotating the spool, and a guide on said pawl to hold the cable in proper position upon the spool.

In testimony whereof I affix my signature, in the presence of two witnesses.

FRED. M. HOLLINGSWORTH.

Witnesses:
L. J. FISCHER,
FRED C. FISCHER.